J. J. NEES.
DEVICE FOR OILING JOURNAL BEARINGS AND THE LIKE.
APPLICATION FILED APR. 21, 1913.
1,175,872. Patented Mar. 14, 1916.
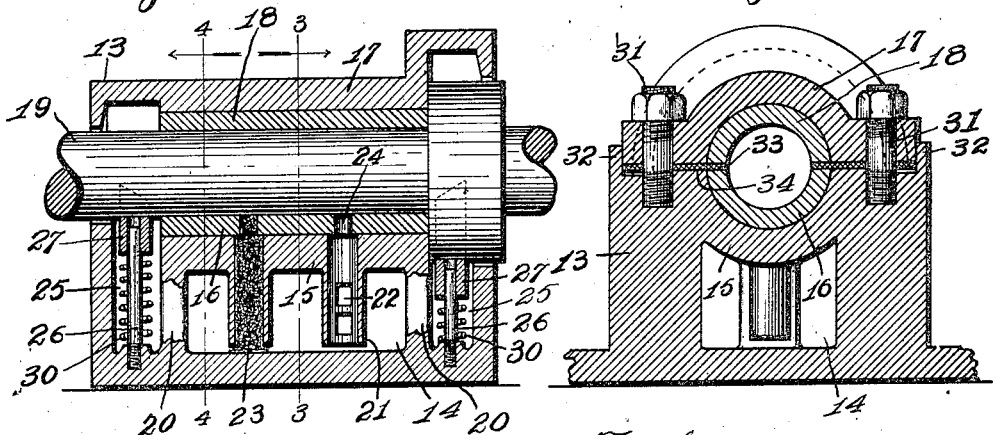
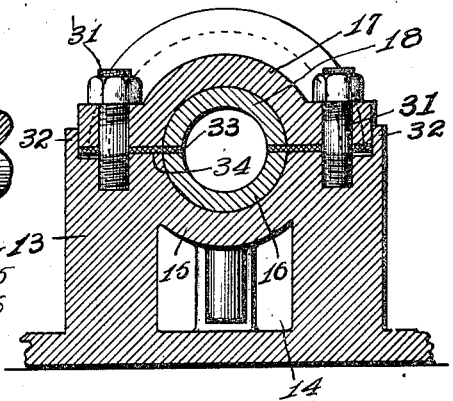
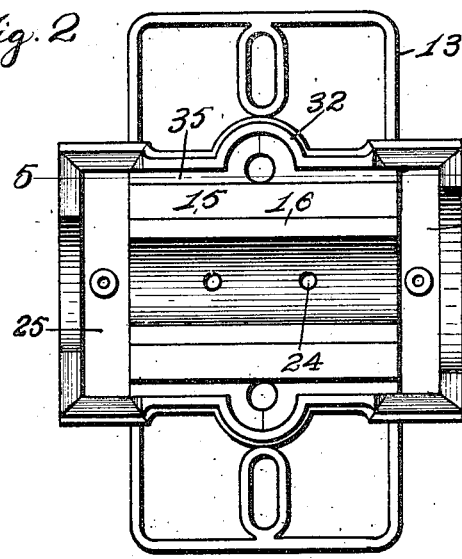
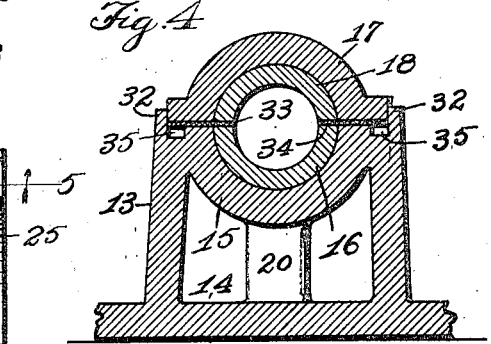
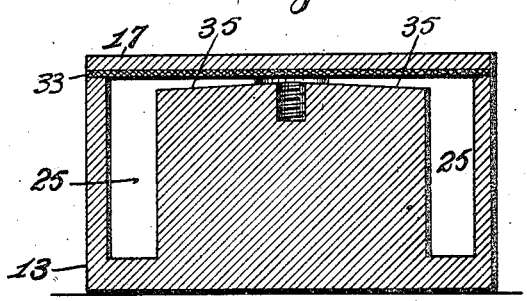
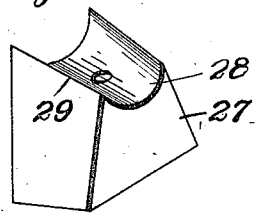

UNITED STATES PATENT OFFICE.

JOHN J. NEES, OF ST. LOUIS, MISSOURI.

DEVICE FOR OILING JOURNAL-BEARINGS AND THE LIKE.

1,175,872.

Specification of Letters Patent.  Patented Mar. 14, 1916.

Application filed April 21, 1913. Serial No. 762,616.

*To all whom it may concern:*

Be it known that I, JOHN J. NEES, a citizen of the United States, and resident of St. Louis, Missouri, have invented certain new and useful Improvements in Devices for Oiling Journal-Bearings and the like, of which the following is a specification.

This invention relates to improvements in a system for oiling journal bearings and the like and has for its object a means whereby oil is fed to the rotating parts from a reservoir or oil well, and means for removing the superfluous oil from the rotating parts and directing it back to the well so as to prevent the oil from escaping and passing beyond the journal bearing.

A further object of my invention is to provide journal bearings with an oil feeding mechanism in the form of absorbent material extending from an oil well or reservoir to the rotating parts, the outer surface of the journal bearing being constructed to prevent oil from escaping at the division point of the bearing and its cap, and devices communicating with the rotating part to remove all superfluous oil and direct it back to the oil well.

Figure 1 is a vertical sectional view of a journal bearing showing my invention. Fig. 2 is a top plan view of the same with the cover or cap removed. Fig. 3 is a cross-sectional view taken on the line 3—3 of Fig. 1, the shaft or rotating part being removed. Fig. 4 is a cross-sectional view taken on the line 4—4 of Fig. 1 with the shaft or rotating part removed. Fig. 5 is a sectional view taken on the line 5—5 of Fig. 2. Fig. 6 is a detail perspective view of one of the wipers made use of for removing the superfluous oil from the rotating part.

The invention in general has reference to a system of providing oil to the rotating parts of any form of journal bearing, and the structure consists of a suitable casing or box 13 provided with an oil well or receptacle 14; the box is provided with a suitable bearing portion 15 in which the Babbitt lining or journal seat 16 is supported and on the top is located a cap or cover 17 also provided with a Babbitt lining 18; in this Babbitt lining is located a shaft or rotating part 19. The bearing portion 15 is provided with suitable legs or braces 20 extending downwardly into the oil receptacle and formed integral with the material of the box and bearing portion, and at suitable intervals, and projecting downwardly from the bearing portion 15 are sleeves or tubes 21, the lower end terminating a short distance from the bottom of the receptacle and said tubes are also provided with perforations or openings 22 through which the oil in the receptacle is permitted to pass; in these tubes I place absorbent material 23 preferably sponge, and this sponge is permitted to contact with the surface of the shaft or rotating part through suitable openings 24 formed in the Babbitt lining or journal seat 16, and by the rotation of the shaft the oil is permitted to contact and properly provide the rotating part with lubricant.

The ends of the journal box are provided with cavities 25 which communicate with the oil receptacle, and in these cavities are mounted studs or pins 26 over which are placed wipers 27, the upper contacting surface being concaved as indicated by the numeral 38 and of such contour as to correspond and closely fit against the surface of the rotating member, the upper edges 29 being inclined so as to remove the oil which might pass along the line of the shaft beyond the bearing proper and direct said superfluous oil inwardly and downwardly into the oil receptacle; these wipers are held in contact with the rotating part by means of springs 30 or the like.

The cap or cover 17 is held in proper position by means of the studs or bolts 31, and the upper edge of the lower portion of the bearing is provided with a projecting flange 32 into which the edge of the cover or cap is seated so as to prevent the oil which may pass between the adjoining edges of the cover and bearing, from passing on the outside of the box; between the adjoining edges is located a strip of packing material 33, the top line 34 of the box being in direct line with the center of the shaft or rotating part.

The two sides of the box within the flanges 32 are suitably inclined toward the ends as indicated by the numeral 35, which directs such oil as might pass between the division point into the cavities 25.

The essential feature of the invention is to provide suitable oiling devices in the form of a sponge, leading from the surface of the rotating part to the oil reservoir, and wipers located at the end of the bearing to remove the superfluous oil and direct it back to the oil reservoir, as well as inclined sides to direct such oil as may escape between the bearing portion and the cap back to the reservoir.

Having fully described my invention what I claim is:

1. A lubricating journal box comprising a base, a movable top located thereon, said base having a journal seat integral therewith, a suitable space above the bottom and forming an oil chamber, and braces located on the ends of the seat and formed integral therewith, and with the bottom of the lower member and so arranged as to form a cavity at each end of the seat and the upper edges of the brace member being tapered to convey superfluous oil back to the cavity to be delivered to the receptacle, substantially as specified.

2. A lubricating journal box comprising a base, said base having a journal seat formed integral therewith and spaced a reasonable distance from the bottom of the box, braces located at the ends and forming cavities on each end of the journal seat, a detachable cover located on the box, the upper edges of the side members of the box tapering in two directions from the center forming a passage way for the superfluous oil to be directed to the cavities, and an extension formed on one end of the top to overlap a collar formed on the axle, substantially as specified.

3. A journal box of the class described comprising two members, a bottom supporting member and a detachable top, the bottom supporting member consisting of two side walls, two end walls, a bottom, and a journal seat bridging the box from side wall to side wall and located a reasonable distance above the bottom forming an oil receptacle beneath the same, the upper edge of both side walls being tapered from the center toward the end, thereby forming an oil passage through which superfluous oil may flow back to the receptacle, a pair of braces located in the receptacle and projecting from the journal seat to the bottom, and the upper edge in which the top is seated being slightly sunk in which to prevent any leakage from passing over the upper edges of the walls, substantially as specified.

4. A lubricating journal box comprising a journal box provided with an oil reservoir longer than the bearing portion of the journal, tubes extending from the bearing portion into the reservoir, absorbent material located in the tubes for directing the oil in the reservoir to the bearing surface through capillary attraction, the sides of the box being suitably beveled for directing surplus oil back to the reservoir, and truncated pyramidal wipers located in the box for removing surplus oil from the rotating parts and directing it back to the reservoir.

In testimony whereof, I have signed my name to this specification, in presence of two subscribing witnesses.

JOHN J. NEES.

Witnesses:
ALFRED A. ELLIS,
WALTER C. STEIN.